May 5, 1959
J. P. LACROIX
2,884,725
AUTOMATIC REMINDER FOR CAR MAINTENANCE
Filed Nov. 12, 1957
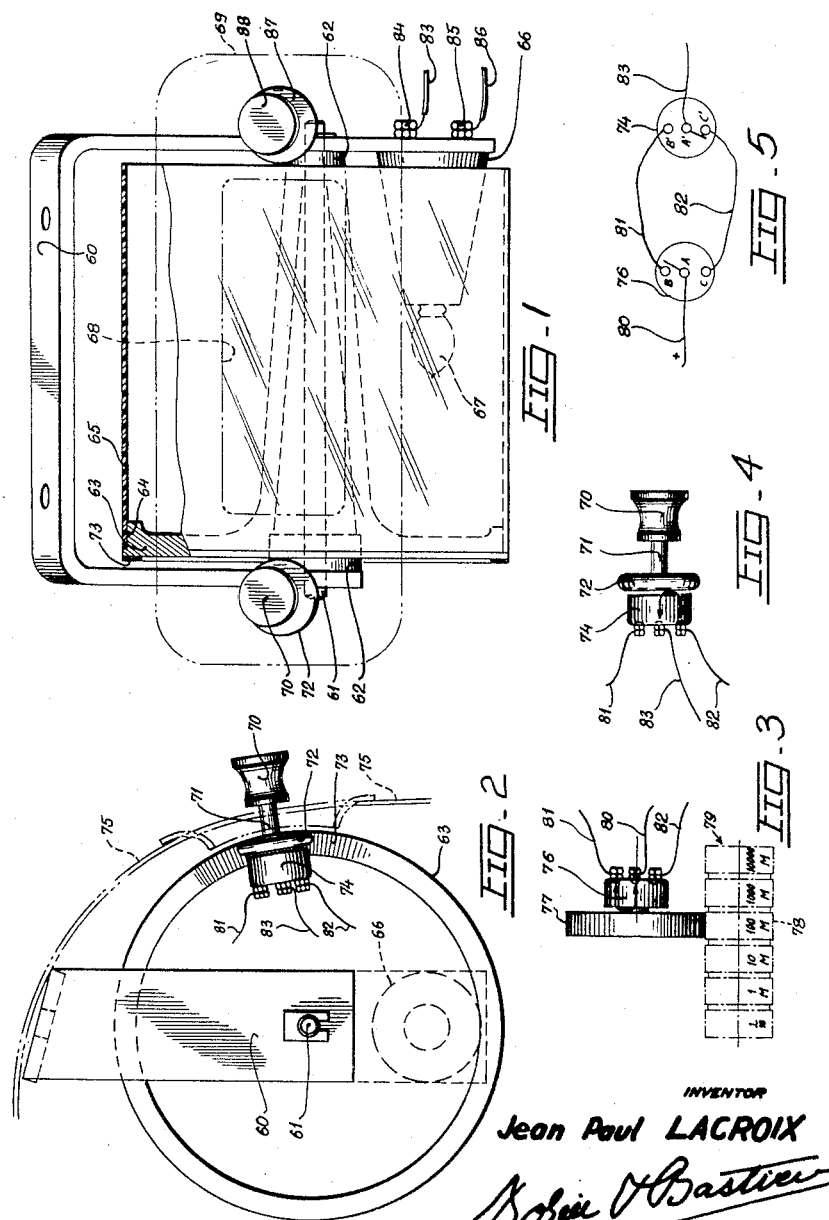
INVENTOR
Jean Paul LACROIX
ATTORNEYS

United States Patent Office 2,884,725
Patented May 5, 1959

2,884,725

AUTOMATIC REMINDER FOR CAR MAINTENANCE

Jean Paul Lacroix, St. Joseph De Sorel, Quebec, Canada

Application November 12, 1957, Serial No. 695,725

2 Claims. (Cl. 40—77)

The present invention relates to an automobile accessory and has for its main object a device to automatically remind the automobile operator of the necessity of attending to general servicing for the proper maintenance of the motor vehicle at a specific mileage interval and also supplying the instructions for carrying out said operations.

Another important object of the present invention is the provision of a device of the character described which will relieve the driver of having to continuously check the mileage to ascertain when the different parts of the vehicle need attention.

Still another important object of the present invention is the provision of a device of the character described which will contribute, to a substantial extent, to a better performance and a longer service life of the automobile by providing means to help keep a predetermined schedule of maintenance of the automobile.

Yet another important object of the present invention is the provision of a device of the character described in which the set instructions for any given mileage will be sufficiently complete to enable any service man to attend to the necessary maintenance without having to refer to a service book.

Still another important object of the present invention is the provision of a device of the character described in which the set of instructions for any given mileage will become illuminated when said given mileage is reached whereby said instructions will be clearly readable.

Another object of the present invention is the provision of a device of the character described in which the set of instructions for a given mileage will become illuminated only when it is time to attend to the series of maintenance operations for said given mileage and will normally remain lighted to act as a constant reminder for the automobile driver until reset means are actuated after the operations have been carried out.

Another important object of the present invention is the provision of a device of the character described which is of relatively small size and which can be easily installed behind the instrument panel of the motor vehicle in a position visible from the driver's seat.

According to a preferred embodiment of the invention, the rotary drum is manually rotated and the device is only electrically connected to the total mileage indicator of the automobile thereby providing for more flexibility in the mounting of the device in the automobile.

The foregoing and other important object of the present invention will become more apparent during the following disclosure and by referring to the drawings in which:

Figure 1 is a front view, partially in section, of a preferred embodiment;

Figure 2 is an end view of the embodiment;

Figure 3 is a side view of the three-way switch associated with the total mileage indicator of the automobile;

Figure 4 is a side elevation of the three-way switch and associated knob mounted on the device of Figure 1 and electrically connected to the three-way switch of Figure 3; and Figure 5 is a schematic plan view of the electrical connections between the three-way switches.

Referring more particularly to the drawings in which like reference characters indicate like elements throughout, reference numeral 60 indicates a U-shaped bracket adapted to be secured and positioned behind the instrument panel of the motor vehicle and at the outer ends of the side legs of said bracket a shaft 61 is journalled in horizontal position.

A spindle 62 is mounted on the shaft 61 and extends between the two sides of the bracket 60. One end of the spindle 62 is provided with a cylindrical shoulder 64 on which is mounted, with a pressed fit, a cylindrical sheet 65 of translucent material having a length substantially equal to the length of the spindle 62.

The space between the translucent sheet 65 and the spindle 62 is open at one end of the spindle for the insertion of lamp base and socket 66 mounting a light bulb 67 inside the translucent cylindrical sheet 65. The lamp base 66 is rigidly secured to one side leg of the U-shaped bracket 60.

The translucent cylindrical sheet 65 carries a plurality of sets of instructions arranged in ten longitudinally extending sections. Each set of instructions is adapted to register in turn with a window 68 made in a face plate 69 adapted to be secured to the dashboard of the automobile motor vehicle in front of the device.

Thus the assembly of the spindle 62 and cylindrical sheet 65 forms a freely rotatable drum. This drum is adapted to be manually rotated by means of a knob 70 secured to a shaft 71 to which is fixed a friction wheel 72 adapted to frictionally contact the marginal portion of the circular flange 63, said marginal portion being preferably provided with an annular band of rubber or other friction material as shown at 73. This rubber band 73 could obviously be replaced by any other friction producing means, such as serrations made on the marginal portion of the outer face of the flange 63.

The shaft 71 mounting the knob 70 and the rubber wheel 72 is also the shaft of a three-way switch 74. Said three-way switch 74 is suitably secured by a bracket, not shown, either to the bracket 60 or directly to the dashboard 75 of the motor vehicle in such a position that the wheel 72 will be in frictional contact with the annular band 73 and with the knob 70 disposed outside of the dashboard 75 for easy access thereto.

A second three-way switch 76 has its shaft provided with a friction wheel 77 in frictional contact with the hundred mile wheel 78 of the conventional total mileage indicator 79 of the motor vehicle. The assembly of the switch 76 and wheel 77 are secured to a position close to the total mileage indicator 79 by means of a bracket (not shown).

The three-way switches 74 and 76 are connected in the manner shown in Figure 5. The contact arm A of the switch 76 is connected to the ignition circuit of the automobile by means of electric wire 80. The stationary contacts B and C of the switch 76 are connected to the outer stationary contacts B' and C' of the switch 74 by means of wires 81 and 82. The movable contact arm A' of switch 74 is secured to shaft 71 and is connected to electric light 67 by means of wire 83 and terminal 84 on the base 66 of the light bulb 67. The terminal 85 of the base 66 is connected to ground by means of wire 86.

The device in accordance with the invention is operated as follows:

When the cylinder 78 indicating the hundred miles of the conventional total mileage indicator 79 of the automobile, has turned a complete turn, that after a travel of a thousand miles by the automobile, the friction wheel 77, which is twice the diameter of the cylinder 78, will have turned a half turn and will have connected arm A with contact C in the rotary switch 76 (the contact between A' and C' in switch 74 having been previously made when the circuit of light bulb 67 was closed at the last thousand miles). Thus the following circuit is closed: wire 80; contacts A, C; wire 82; contacts C', A'; wire 83; light bulb 67, terminal 85; and wire 86; the bulb 67 is lighted and illuminates the instructions on the section of the cylindrical sheet 65 in register with the window 68 of the face plate 69, said instructions corresponding to the thousand miles indicated by the total mileage indicator 79. Once the given set of instructions has been carried out, the knob 70 is rotated through half a turn thereby rotating the cylindrical sheet 65 one tenth of a turn to bring the successive set of instructions in register with the window 68. When the knob 70 is rotated one half turn, the contact arm A' of switch 74 makes contact with terminal B' of said switch, while the arm A of switch 76 remains on contact C, therefore the electric circuit to the light bulb 67 is open and the latter does not illuminate the set of instructions now in register with the window 68.

The light bulb 67 will only becomes lighted when the electric circuit thereto is closed by a half rotation of arm A of switch 76 to make contact with terminal B, said half rotation being completed when cylinder 78 has accomplished one whole turn, that is, at the next thousand miles.

The device has a push button switch 87 provided with a push button 88 projecting outwardly of the face plate 69 and mounted on the side of the device opposite the knob 70. The push button switch 87 is electrically connected to the light bulb 67 to temporarily close the circuit of said light bulb for temporarily illuminating the next set of instructions in register with window 68 and which are not to be carried out before said set of instructions become illuminated by actuation of the switch 76.

The electric circuits of the switches 74 and 87 serve also as a safety system because the set of instructions to be next carried out and already in register with window 68 can only be illuminated by pressure on push button 88, the past set of instructions can only be automatically illuminated when turning the knob 70 in a reverse direction to rotate the cylindrical sheet 65 backwards and register said past set of instructions with window 68. The light will automatically shut off when the drum is again rotated forwardly into its original position.

Thus, when the maintenance service is completed on the automobile and the instructions are not illuminated this means that the knob 70 has been rotated to bring the next set of instructions in register with window 68 thereby shutting off light 67. If the instructions are still illuminated, then, either the serviceman forgot to turn the knob to the next set of instructions, or did not carry out the instructions for maintenance; once the knob is turned to the next set of instructions thereby shutting off the lamp, the device is ready to be illuminated again at the next 1,000 miles.

It should be noted that with the arrangement in accordance with the present invention, it is possible to vary the number of sets of instructions inscribed on the cylindrical translucent sheet 65; that is, thousand mile sets of instructions may be provided for less or more than ten thousand miles by simply varying the relative diameters of the friction wheel 72 and annular band 73.

The electric circuit of the device, in accordance with the present invention, is preferably connected to the ignition circuit of the motor vehicle, so that the set of instructions for the maintenance not yet carried out will become illuminated only when the ignition is switched on.

The device, in accordance with the present invention, has substantially the size of a small portable radio and may be, if desired, positioned behind the instrument panel of the motor vehicle in place of the conventional radio or in any suitable location.

The device, in accordance with the present invention, is nevertheless big enough so that any longitudinal section of the cylindrical sheet in any of the two embodiments will have sufficient space for the inscription of a set of detailed instructions.

While a preferred embodiment according to the present invention has been illustrated and described it is understood that various modifications may be resorted to without departing from the spirit and scope of the appended claims.

I claim:

1. A device for automatically indicating the maintenance work to be carried out at prescribed intervals on a motor vehicle having total mileage indicator cylinders, said device comprising a rotatively mounted cylindrical translucent sheet marked with a plurality of longitudinal sections each indicating a particular set of instructions for the maintenance work to be carried out at a given mileage, illuminating means disposed within said sheet, manual means to rotate said sheet to bring the next longitudinal section into a reading position, said manual means including a friction wheel in contact with said sheet, a knob for rotating said friction wheel and electric circuit means for operating said illuminating means and responsive to the rotation of both said sheet and one of said total mileage indicator cylinders to illuminate the particular set of instruction in the reading position after a predetermined mileage interval, said electric circuit means including a first three-way electric switch operable by said knob, a second three-way electric switch operable by said one of the total mileage indicator cylinders, and wires interconnecting said illuminating means and said two three-way switches so arranged that closing of the circuit to the illuminating means is effected by rotation of said one total mileage indicator cylinder which actuates said second three-way switch, and opening of the circuit to the illuminating means is effected by rotation of said knob which actuates said first three-way switch, wherein said friction wheel, said knob and said first three-way switch are arranged in a common assembly comprising a casing for said switch, two stationary contacts for said switch mounted in said casing, a shaft extending through said casing and bearing a movable contact of said three-way switch, said friction wheel and said knob being secured to said shaft, said second three-way switch comprising a casing, two stationary contacts mounted within said casing, a shaft extending through said casing, a friction wheel secured to said shaft and in frictional contact with said one of the total mileage indicator cylinders, the stationary contacts of both three-way switches being inter-connected and each being mounted at 180 degrees angular interval, and the movable contacts of both three-way switches being mounted in series within the circuit of said illuminating means.

2. A device as claimed in claim 1, wherein one complete rotation of said one total mileage indicator cylinder effects half a rotation of the rotary contact of said second three-way switch and rotation of said sheet to bring the next longitudinal section in reading position effects half a rotation of the rotary contact of said first three-way switch.

References Cited in the file of this patent

UNITED STATES PATENTS

| | | |
|---|---|---|
| 1,331,820 | Myers | Feb. 24, 1920 |
| 1,637,988 | Egan | Aug. 2, 1927 |
| 1,693,075 | Frier | Nov. 27, 1928 |
| 1,731,960 | Wilson | Oct. 15, 1929 |
| 1,891,335 | Reisinger | Dec. 20, 1932 |
| 2,052,080 | Cale | Aug. 25, 1936 |
| 2,130,613 | Colee | Sept. 20, 1938 |
| 2,396,687 | Crane | Mar. 19, 1946 |